(12) United States Patent
Laubry et al.

(10) Patent No.: US 8,261,798 B2
(45) Date of Patent: Sep. 11, 2012

(54) POLYURETHANEUREA SYSTEM

(75) Inventors: Philippe Laubry, Charbonnieres-les-Varennes (FR); Pete Proner, Pendleton, SC (US); Claudio Battocchio, Riom (FR); Brian B. Hightower, Bridgewater (CA); S. Todd Martin, Simpsonville, SC (US)

(73) Assignee: Michelin Recherche ET Technique S.A., Granges-Paccot (CH)

( * ) Notice: Subject to any disclaimer, the term of this patent is extended or adjusted under 35 U.S.C. 154(b) by 1108 days.

(21) Appl. No.: 12/112,915

(22) Filed: Apr. 30, 2008

(65) Prior Publication Data
US 2008/0264541 A1 Oct. 30, 2008

Related U.S. Application Data

(63) Continuation-in-part of application No. PCT/US2007/083019, filed on Oct. 30, 2007, which is a continuation-in-part of application No. PCT/US2006/042138, filed on Oct. 30, 2006.

(51) Int. Cl.
B60C 1/00 (2006.01)
(52) U.S. Cl. .......................... 152/565; 152/367; 156/97
(58) Field of Classification Search .................. 152/565, 152/367; 156/97
See application file for complete search history.

(56) References Cited

U.S. PATENT DOCUMENTS

| | | | |
|---|---|---|---|
| 2,905,582 A * | 9/1959 | Coleman, Jr. et al. | 156/310 |
| 2,992,962 A * | 7/1961 | Borland et al. | 152/209.5 |
| 4,327,138 A | 4/1982 | Hausch | |
| 4,434,832 A * | 3/1984 | Koch et al. | 152/370 |
| 4,923,543 A | 5/1990 | Koch et al. | |
| 5,110,629 A * | 5/1992 | Gomberg et al. | 427/322 |
| 5,153,261 A * | 10/1992 | Brooks | 525/28 |
| 5,183,877 A * | 2/1993 | Swanson | 528/64 |
| 5,418,310 A * | 5/1995 | Kangas | 528/59 |
| 5,462,617 A | 10/1995 | Bender et al. | |

(Continued)

FOREIGN PATENT DOCUMENTS
AU A-72924/87 11/1987
(Continued)

OTHER PUBLICATIONS

International Search Report and Written Opinion dated Sep. 25, 2007 for PCT/06/42138.

*Primary Examiner* — Joseph Del Sole
*Assistant Examiner* — David N Brown, II
(74) *Attorney, Agent, or Firm* — Cozen O'Connor

(57) ABSTRACT

A polyurethaneurea system that includes in some embodiments Parts A and B reaction components for a polyurethaneurea, wherein an exemplary embodiment provides a Part A that comprises between 55 and 75 wt. % of an oligomeric polyol, between 3 and 7 wt. % of an aromatic diamine chain extender, and between 0.1 and 1.5% of a reactivity catalyst; Part B includes between 1 and 15 wt. % of a short aromatic diisocyanate and between 5 and 35 wt. % of an aromatic diisocyanate prepolymer that is the reaction product of a short aromatic diisocyanate and a diol. The polyurethaneurea system may further comprise an elastomer-surface activator comprising a second short aromatic diisocyanate and a second aromatic diisocyanate prepolymer, wherein at least one of the second diisocyanates may be the same as at least one of the diisocyanates of Part B.

19 Claims, 2 Drawing Sheets

U.S. PATENT DOCUMENTS

| | | | |
|---|---|---|---|
| 5,643,648 A * | 7/1997 | Kobe et al. | 428/63 |
| 6,423,810 B1 | 7/2002 | Huang et al. | |
| 6,688,353 B1 * | 2/2004 | Koch | 152/152.1 |
| 7,096,727 B2 * | 8/2006 | Adamson et al. | 73/146 |
| 2005/0126668 A1 * | 6/2005 | Fornerod et al. | 152/152.1 |
| 2008/0264541 A1 * | 10/2008 | Laubry et al. | 152/510 |
| 2010/0021676 A1 * | 1/2010 | Laubry | 428/63 |
| 2010/0068530 A1 * | 3/2010 | Laubry | 428/423.9 |

FOREIGN PATENT DOCUMENTS

| | | |
|---|---|---|
| AU | A-73299/87 | 1/1988 |
| GB | 2039232 A | 8/1980 |

\* cited by examiner

POLYURETHANEUREA SYSTEM

This application is a continuation-in-part of International Application No. PCT/US07/83019 filed Oct. 30, 2007, which was a continuation-in-part of International Application No. PCT/US06/42138 filed Oct. 30, 2006.

BACKGROUND OF THE INVENTION

1. Field of the Invention

This invention relates generally to polyurethaneurea systems and more particularly, to polyurethaneurea systems useful for bonding and filling elastomers, especially elastomers comprising cross-linked rubber.

2. Description of the Related Art

Various adhesive products, including polyurethane adhesive products, are commercially available to use as sealants or to patch polymeric elastomeric materials such as, for example, natural rubber, synthetic rubber, plasticized polyvinyl chloride, polychloroprene and the like.

Polyurethanes are typically synthesized from a polyisocyanate, a polyglycols and a chain extender. The chain extender is typically selected from a low molecular weight diol, diamine, aminoalcohol or water. When the chain extender is a diol, the polyurethane that is formed consists entirely of urethane linkages. However, if, for example, the chain extender is water, aminoalcohol or a diamine, both urethane and urea linkages are present and the resulting composition is called a polyurethaneurea or PUU. Therefore, a polyurethane type composition having both urethane and urea linkages may be called a polyurethaneurea.

SUMMARY OF THE INVENTION

Particular embodiments of the present invention include a polyurethaneurea system that is useful for bonding and/or repairing an elastomer. The system includes reaction components that react to form a polyurethaneurea, the reaction components including a Part A and a Part B. These Parts may comprise mixtures as follows, with the mass fraction of each of the reaction components based upon the total mass of the part A and part B reaction components: Part A is a mixture comprising between about 55 and about 75 wt. % of an oligomeric polyol (a primary polyol in some embodiments) having an average molecular weight greater than about 1000, between about 3 and about 7 wt. % of an aromatic diamine chain extender, and between about 0.1 and about 1.5% of a reactivity catalyst; Part B is a mixture comprising between about 1 and about 15 wt. % of a short aromatic diisocyanate and between about 5 and about 35 wt. % of an aromatic diisocyanate prepolymer that is the reaction product of a short aromatic diisocyanate and a diol. Particular embodiments of the polyurethaneurea system provide that a ratio of isocyanate functionalities to a total of the amine and hydroxyl functionalities in the mixture of part A and part B is between about 0.8 and about 2. Alternatively, particular embodiments provide that the ratio is between about 1 and about 1.07.

The polyurethaneurea system may further comprise an elastomer-surface activator comprising a second short aromatic diisocyanate and a second aromatic diisocyanate prepolymer, wherein at least one of the second diisocyanates may be the same as at least one of the diisocyanates of Part B.

Particular embodiments of the present invention further provide a process, comprising reacting the reaction components of the polyurethaneurea system described above. The method may further include applying the polyurethaneurea to a face of a cross-linked rubber article and bonding the face of the cross-linked rubber article to a substrate. Particular embodiments of the process may further include applying an elastomer-surface activator to the face of the cross-linked rubber article, wherein the elastomer-surface activator comprises a second short aromatic diisocyanate and a second aromatic diisocyanate prepolymer. Optionally, the process may include priming the face of the cross-linked rubber article with a solution of trichloroisocyanuric acid in a solvent.

Particular embodiments of the present invention further include articles comprising a component bonded to the article with the polyurethaneurea system described above.

Particular embodiments of the present invention provide a method for retreading a tire, including applying the elastomer-surface activator to a bonding surface of a tread band, applying the polyurethaneurea material to the bonding surface of the tread band, and placing the bonding surface of the tread band having the polyurethaneurea material thereon onto an outer bonding surface of a tire carcass.

Particular embodiments of the present invention further provide a method of repairing an elastomeric article, comprising coating a damaged surface of the elastomeric article with the elastomer-surface activator, wherein the damaged surface is an exposed surface of a hole, gash, gouge, split, cut or tear in the article; and filling the hole, gash, gouge, split, cut or tear in the article with the polyurethaneurea described above.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1:
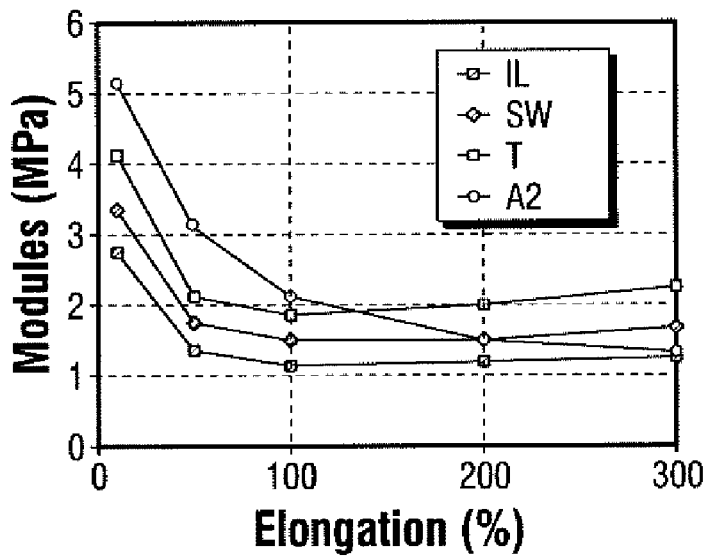
FIG. 1 is a graph plotting elongation and modulus of different rubber compositions and an exemplary polyurethaneurea material in accordance with the present invention.

The present invention includes a polyurethaneurea system, methods of its making and methods of its use. The polyurethaneurea system is useful as an adhesive and/or as a repair material for various articles, including elastomeric articles and including elastomeric articles that comprise a cross-linked (cured) rubber compound. The polyurethaneurea system is useful as a repair material to fill holes, gashes, gouges, splits, cuts, tears and/or other damage resulting in a loss of the original material, including elastomeric material, that is to be repaired. The present invention further includes articles having the polyurethaneurea as an adhesive and/or repair material. In particular embodiments, the polyurethaneurea is useful for securing a patch to an elastomer article. The polyurethaneurea system is useful for repairing elastomer articles including elastomeric articles that comprise a cross-linked (cured) rubber compound without requiring the repair to be cured at a high temperature.

The polyurethaneurea system of particular embodiments provides a polyurethaneurea product resulting from the reaction of Part A and Part B reaction components. Part A may comprise a mixture of reaction components including an oligomeric polyol and an aromatic diamine chain extender while Part B may comprise a mixture of reaction components including a short aromatic diisocyanate and an aromatic diisocyanate prepolymer, the prepolymer being the reaction product of a short aromatic diisocyanate with a diol. Advantageously, particular embodiments include no solvent and/or no fillers in the Part A and Part B mixtures.

The mixture of the Part A and Part B reaction components may be characterized in some embodiments as having a ratio of isocyanate functionalities to a total of the amine and hydroxyl functionalities in the mixture of between about 0.9 and about 2. Other embodiments have such a ratio of between about 1 and about 1.7 while other embodiments have a ratio of between about 1 and about 1.07 or between about 1 and about 1.03.

The Part A mixture used to form the polyurethaneurea system of particular embodiments includes an oligomeric polyol and an aromatic diamine chain extender. The oligomeric polyol reacts to form the urethane linkages in the polyurethaneurea composition. Particular embodiments include an oligomeric polyol having an average molecular weight greater than about 1000 or between about 1000 and 4000 while other embodiments include a polyol having an average molecular weight of between about 1500 and 4000 or between about 2000 and about 4000. All molecular weights are expressed throughout as weight average molecular weights unless otherwise indicated.

The oligomeric polyol reaction component of particular embodiments may be characterized as having no oligomeric polyol having a molecular weight of less than about 1000 or alternatively, less than about 900 or less than about 800. Alternatively, in particular embodiments, the oligomeric polyol may include no more than about 5 wt. % or alternatively no more than about 10 wt. %, 15 wt. % or about 25 wt. % of oligomeric polyol having a molecular weight of less than about 1000, less than about 900 or less than about 800 respectively.

The oligomeric polyol reaction component of particular embodiments may further be characterized as being predominately a primary oligomeric polyol. For example, some embodiments may include an oligomeric polyol as being 100 wt. % primary oligomeric polyol or alternatively at least 95 wt. % primary oligomeric polyol or at least 75 wt. % primary oligomeric polyol. Particular embodiments include an oligomeric polyol reaction component having an OH functionality of about 2.

Non-limiting examples of suitable primary oligomeric polyols include polyether polyols, amine-terminated polyols, polyester polyols, polyester ether polyols, polycyclic polyols and polycarbonate polyols. Polyether polyols include polytetramethylene ether glycol (PTMEG). Amine-terminated polyols are based on polyether glycols that have had the terminal hydroxyl groups replaced by primary or secondary amino functionalities. The polyester polyol may include, for example, polyethylene adipates, polyethyleneglycol adipates, polycaprolactone diols, and polycaprolactone-polyadipate copolymer diols.

For those embodiments that do not include only a primary oligomeric polyol, then secondary polyols, for example, may be included in as a reaction component in particular embodiments. Such secondary oligomeric polyol may include, for example, polybutylene oxide glycol (PBO), polypropylene oxide glycol (PPO) and castor oil.

Optionally, the oligomeric polyol reaction component may include mixtures of oligomeric polyol selected from those described above and/or from others as known to those having ordinary skill in the art.

Particular embodiments include an amount of the oligomeric polyol reaction component (expressed as the wt. % of the total mass of the reactant components of Part A and Part B) as being between about 50 wt. % and about 80 wt. % of the total mass or alternatively between about 55 wt. % and about 75 wt. % or between about 60 wt. % and about 72 wt. %.

Another reaction component that may be included in the Part A mixture is an aromatic diamine chain extender. The aromatic diamine chain extender reacts to form the urea linkages in the polyurethaneurea reaction product. The aromatic diamine chain extender may be, for example, a primary and/or a secondary aromatic diamine. Particular embodiments include only primary aromatic diamine or the aromatic diamine reaction component may include, for example, at least 75 wt. % or at least 95 wt. % primary aromatic diamine.

Non-limiting examples of the aromatic diamine chain extender reaction component include 2,4 and 2,6 isomers of DETDA (diethyltoluenediamine), methylenebis(N,N-dibutyldianiline), IPDA (isophoronediamine), or 3,5-dimethylthio-2,4-toluenediamine, 3,5-dimethylthio-2,6-toluenediamine isomers or mixtures thereof. Other examples include methylene dianiline (MDA), 4,4'-methylene-bis-3-(chloro-2,6-diethylbenzenamine) (MCDEA); 4,4'-methylene-bis-(2-ethyl-6-methylaniline) (MMEA); 4,4'-bis-(2,6-diethylaniline) (MDEA); 4,4'-methylene-bis-(2-isopropyl-6-methylaniline) (MMIPA); 4,4'-bis(sec-butylamino) diphenylmethane; phenyl-enediamine; methylene-bis-orthochloroaniline (MBOCA); 4,4'-methylene-bis-(2-methyl-aniline) (MMA); 4,4'-methylene-bis-(2-chloro-6-ethylaniline) (MCEA); 1,2-bis(2-amino-phenylthio)ethane; N,N'-di-alkyl-p-phenylenediamine; 4,4'-methylene-bis(2,6-diisopropylaniline) (MDIPA); dimethylthiotol-uenediamine (DMTDA) or mixtures thereof.

Optionally, the aromatic diamine chain extender reaction component may include mixtures of aromatic diamine chain extender selected from those described above and/or from others as known to those having ordinary skill in the art.

Particular embodiments include an amount of the aromatic diamine chain extender reaction component (expressed as the wt. % of the total mass of the reactant components of Part A and Part B) as being between about 0 wt. % and about 10 wt. % of the total mass or alternatively between about 5 wt. % and about 7 wt. % or between about 3.5 wt. % and about 5 wt. %.

The Part B mixture used to form the polyurethaneurea system of particular embodiments includes a short aromatic diisocyanate and a prepolymer. The prepolymer may be formed of a short aromatic diisocyanate and a diol. A short aromatic diisocyanate is typically a non-polymerized component.

The short aromatic diisocyanate reaction component included in particular embodiments may be characterized as being a low-viscosity liquid at room temperature for ease of handling; e.g., a short aromatic diisocyanate having a viscosity of between about 20 and about 30 cps at 25° C. The short aromatic diisocyanate reaction component typically has a molecular weight that is less than about 500 with particular embodiments having a molecular weight of between 160 and 500 or alternatively between 160 and 300. In particular embodiments, the short aromatic diisocyanate reaction component may have a isocyanate functionality of 2 or alternatively, between about 1.8 and 2.2 or between about 1.9 and about 2.1.

Non-limiting examples of suitable short aromatic diisocyanates include, for example, phenylene diisocyanate, p- and m-phenylene diisocyanates; toluene diisocyanates, xylene diisocyanates, 2, 4 and/or 2,6 toluene diisocyanates (TDI), 1,5-naphthalene diisocyanate; carbodimide modified methylene diisocyanate, 4,4'-diphenyl-methane diisocyanate (MDI) and, if appropriate, its higher homologues (polymeric MDI), modified MDI compounds, naphthalene diisocyanates (NDI), isomer mixtures of individual aromatic diisocyanates or combinations thereof. An example of a modified MDI compound that is useful as a short aromatic diisocyanate is a polycarbodiimide-modified diphenylmethane diisocyanate such as is available from the Dow Chemical Company as ISONATE 143L.

Particular embodiments include an amount of the short aromatic diisocyanates reaction component (expressed as the wt. % of the total mass of the reactant components of Part A and Part B) as being between about 0 wt. % and about 25 wt. % of the total mass or alternatively between about 1 wt. % and about 15 wt. % or between about 1 wt. % and about 13 wt. %.

The aromatic diisocyanate prepolymer reaction component of the Part B mixture of the polyurethaneurea system may in particular embodiments be characterized as the reaction product between a short aromatic diisocyanate as described above and a diol. The aromatic diisocyanate prepolymer may further be characterized as having an isocyanate functionality of 2 or alternatively, between about 1.8 and 2.2 or between about 1.9 and about 2.1.

In particular embodiments, the diol reacted to form the aromatic diisocyanate prepolymer is a primary diol. In particular embodiments, the diol used to form the prepolymer may be 100 wt. % a primary diol, may be greater than about 95 wt. % a primary diol, may be greater than about 75 wt. % a primary diol or may be greater than about 50 wt. % a primary diol. Particular embodiments include a diol having a molecular weight of between about 250 and about 3000 or alternatively, between about 400 and about 2000.

Typically, suitable prepolymers may have a molecular weight that is greater than 500 or that is between about 500 and about 4000. Other embodiments include prepolymers having a molecular weight that is between about 800 and about 3000 or alternatively, between about 850 and about 1500.

A useful prepolymer as a reaction component for particular embodiments may be the reaction product of a short aromatic diisocyanate and a polyether or polyester-based primary diol. An example of a useful polyether-based aromatic diisocyanate prepolymer is a polyether-based diphenylmethane diisocyanate terminated prepolymer such as is available from Chemtura as VIBRATHANE B836. This prepolymer is the reaction product of a polyether with diphenylmethane diisocyanate (MDI).

Particular embodiments include an amount of the aromatic diisocyanate prepolymer reaction component (expressed as the wt. % of the total mass of the reactant components of Part A and Part B) as being between about 0 wt. % and about 50 wt. % of the total mass or alternatively between about 5 wt. % and about 45 wt. % or between about 10 wt. % and about 35 wt. %.

The pot life, or the time limit for use of the polyurethaneurea adhesive/repair material before it becomes too viscous to spread, may be between about 1.5 and about 4 minutes at 40° C. after the reaction components (Part A and Part B) have been mixed together. Particular embodiments of the polyurethaneurea system may therefore include, as a reaction component, a reactivity catalyst that is useful to adjust the pot life, as known to those having ordinary skill in the art. An exemplary reactivity catalyst is alicyclic (cyclo-aliphatic) tertiary amine such as triethylenediamine.

The reactivity catalyst may be typically added to the reaction components at between about 0.1 and about 1.5 wt. % of the total reaction components (Part A and Part B). In other embodiments, the reactivity catalyst may be added to the reaction components at between about 0 and about 15 wt. %, between about 0.05 and about 9 wt. % or between about 0.4 and about 1 wt. %.

It was found that in particular embodiments, the omission of the catalyst provided a polyurethaneurea material that was much more rigid and quite opaque when compared to the material of other embodiments that resulted when the catalyst was added. Particular embodiments that include the reactivity catalyst advantageously provide a polyurethaneurea material that is typically similar in physical properties, e.g., rigidity, elongation at break and hysteresis, to the rubber elastomeric materials being bonded and/or repaired.

Protectorants may also be added to the reaction components to provide protection against environmental hazards. Such protectorants may include, for example, antioxidants, UV absorbers, light stabilizers and combinations thereof. Reactive polymeric colorants may also be added as reaction components to provide coloration to the polyurethaneurea material. For example, if repairing a tire, black colorant may be used so that the repair material matches the color of the tire. If repairing a white portion of a tire, for example repairing raised white letters on the tire or white sidewalls on the tire, titanium dioxide may be added to the repair material to make the repair material white.

Particular embodiments of the polyurethaneurea system may further include an elastomer-surface activator used to coat the surface of a material being bonded or repaired prior to the application of the Part A and Part B mixtures. The material being bonded and/or repaired by the polyurethaneurea system of particular embodiments may be an elastomeric material and/or a cross-linked rubber material. The use of the elastomer-surface activator provides, in particular embodiments, an improved bonding of the polyurethaneurea formed from the Part A and Part B mixtures to the surfaces being bonded or repaired.

The elastomer-surface activator of particular embodiments may comprise a short aromatic diisocyanate (as described above) and a prepolymer. The prepolymer may, for example, be the reaction product between a short aromatic diisocyanate and a diol as disclosed above. For particular embodiments, the short aromatic diisocyanate of the elastomer-surface activator may be the same as the short aromatic diisocyanate selected as a reaction component of the Part B mixture or the short aromatic diisocyanate of the elastomer-surface activator may be different than the short aromatic diisocyanate selected as a reaction component of the Part B mixture. Particular embodiments include an elastomer-surface activator comprising only the short aromatic diisocyanate and the prepolymer without a solvent while other embodiments include a solvent.

For those embodiments that include a solvent in the elastomer-surface activator, the solvent content is typically between about 35 and about 65 wt. % based upon the total mass of the elastomer-surface activator. Suitable solvents include, for example, toluene, ethyl acetate, methyl ethyl ketone (MEK) or mixtures thereof. Particular embodiments of the elastomer-surface activator comprise an amount of the short aromatic diisocyanate of between about 0 and about 90 wt. %, or alternatively between about 0 and about 80 wt. % or between about 5 and about 80 wt. % based upon the total mass of the diisocyanate in the elastomer-surface activator, the remainder being the prepolymer. Particular embodiments include, for example, an about 50:50 wt. % mix of the short aromatic diisocyanate to the aromatic diisocyanate prepolymer or alternatively, an about 5:95 wt. % ratio of the short aromatic diisocyanate to the aromatic diisocyanate prepolymer in the activator.

Particular embodiments of the present invention also include methods for making the polyurethaneurea adhesive/repair material. A particular embodiment includes reacting the Part A mixture with the Part B mixture. In one embodiment, the following amounts (expressed as weight percent of the total mass of reactant components) are reacted:

Part A
  a) between about 55 and about 75% of the oligomeric polyol having an average molecular weight greater than 1000;
  b) between about 3 and about 7% of an aromatic diamine chain extender; and
  c) between 0.1 and 1.5% of the reactivity catalyst.

Part B:
  d) between about 1 and about 15% of the short aromatic diisocyanate;
  e) between about 5 and about 35% of the prepolymer.

It may be noted that the rigidity of the polyurethaneurea material may be adjusted by changing the ratio of the aromatic diamine chain extender to the polyol in the Part A mixture. By increasing the amount of the aromatic amine, the rigidity typically increases in the resulting polyurethaneurea material.

Optionally, between about 0 and about 5 wt. % of protectorants and/or colorants may be added to the reactant mixture. Particular embodiments may include between about 0.5 and about 2 wt. % of these materials. Typically these materials may be added to the Part A mixture of reactant components. In particular embodiments, some or all of these components may be added to the Part b mixture of reactant components. It should be noted that if titanium dioxide is used to impart a white color to the repair material, such as for repairing white sidewalls or white raised lettering on tires, an amount of titanium dioxide greater than these suggested amounts is required. Particular embodiments include adding between 5 and 18 wt. % of titanium dioxide to the Part A mixture.

Particular embodiments of the method for making the polyurethaneurea composition include dispensing the two-part reaction mix through an adhesive dispenser and further, through a dispenser that may have a static mixer. The static mixer, which is typically disposable, ensures that the Part A and Part B mixtures are well mixed during the dispensing step. The adhesive dispenser may be manually, pneumatically or electrically operated. The adhesive dispenser may be used as an alternative to manually proportioning and mixing the Part A and Part B mixtures.

Such dispensers and their use are well known by those having ordinary skill in the art and are available, for example, from ConProTec, Inc., having an office in New Hampshire, under the trade name MIXPAC Systems. The cartridge volume ratio of the adhesive dispenser must be compatible with the adhesive formulation. For example, the MIXPAC systems are available in models that provide mixed adhesive in mix ratios of the two part systems of 1:1, 2:1, 4:1 or 10:1.

Bonding and/or repairing elastomer surfaces using particular embodiments of the polyurethaneurea system may include treating the surfaces to be bonded and/or repaired with the elastomer-surface activator. In particular embodiments of the method, at least one of the surfaces to be bonded and/or repaired include an elastomeric surface, some of which may include an elastomer comprising a cross-linked rubber composition. Optionally, but not required, the elastomer surfaces may be cleaned and treated with a primer to improve the adhesiveness and wetability of the surfaces to be bonded and/or repaired prior to applying the elastomer-surface activator and/or the polyurethaneurea reaction components. Treatment with such a primer typically removes the contamination layers or layers of poor adhesion. An exemplary primer is, for example, a solution of trichloroisocyanuric acid (TIC) in a solvent, for example 2-6% TIC in ethyl acetate.

If the primer is used, the primer may be brushed onto the elastomer surfaces and left on the surfaces for about 15 minutes. Then the surfaces may be rinsed with a solvent, such as with ethyl acetate, to remove any excess TIC. These steps may be repeated until the surface is clean and ready for the elastomer-surface activator and/or the polyurethaneurea reaction components.

The elastomer-surface activator may be applied to the surfaces to be bonded and/or repaired using a brush, spatula, sprayer or other means known to those having ordinary skill in the art. One or more layers of the elastomer-surface activator may be applied to obtain the desired thickness. Particular embodiments include applying a thickness of the elastomer-surface activator of up to about 0.5 mm or alternatively, between about 0.05 and about 0.25 mm. The adhesion of the polyurethaneurea material is typically improved with the use of the elastomer-surface activator prior to application of the two-part polyurethaneurea reaction components.

Particular embodiments of repairing an article and/or bonding surfaces with the polyurethaneurea system may be advantageously carried out at ambient temperatures, i.e., between about 20° C. and about 40° C. If opposing faces are being bonded together, a pressure of, for example, between about 0.03 bar and about 5 bar, may be applied to the bonding pieces, wherein the duration of exertion is typically proportionately longer at lower pressures.

A maturation time for the polyurethaneurea system used in the present invention may be used when bonding and/or repairing materials. This maturation time may typically be about 48 hours at ambient temperature or a few hours at a temperature of between 60° C. and 100° C. Advantageously, the polyurethaneurea system formed primarily of primary diols as discussed above maintains its bonded/repaired state even when subjected to temperatures of at least 130° C., which is a typical curing temperature during a tire retreading process using a cushion gum material to attach the tread to the tire carcass.

Advantageously, particular embodiments of the polyurethaneurea system provides a material that possesses rigidity and hysteresis characteristics that are quite compatible with the rigidity and hysteresis of various cross-linked rubber elastomers used in tires. This characteristic of the polyurethaneurea material makes it very useful as an adhesive and/or repair material for tires.

Particular embodiments of the present invention include articles having bonded faces and/or repairs using the polyurethaneurea system disclosed herein. For example, an article according to particular embodiments of the invention comprises parts that are bonded together at opposing faces by the disclosed polyurethaneurea system, wherein at least one of the opposing faces comprises a cross-linked rubber composition. After mixing the polyurethaneurea reaction components, the polyurethaneurea reaction components are typically applied to the opposing faces of the parts, for example by using a spray gun, a brush or a two-part adhesive gun. In particular embodiments, the elastomer-surface activator is applied to both surfaces of the faces prior to the application of the mixed polyurethaneurea reaction components.

A particular embodiment of the present invention includes a tire having an elastomer patch bonded thereto by the polyurethaneurea system disclosed herein. The elastomer patch may comprise radio frequency identification (RFID) technology and the patch may be bonded to the inner or outer surface of the tire. The patch may include a power source (such as a piezoelectric device or a battery) and/or other electronics such as, for example, an antenna, a printed circuit board and a transmitter. Without limiting the invention to specific materials, particular embodiments of the present invention include bonding a patch having a bonding surface to an inner liner of a tire. The inner liner of the tire is formed of a material that impedes the migration of air therethrough and typically forms the inner surface of the tire. In particular embodiments, the elastomer content of the inner liner of a tire includes butyl based rubber as a majority of the elastomeric content and may typically include between 70 and 100 wt. % butyl based rubber, between 80 and 90 wt. % butyl based rubber, between 90 and 100 wt. % butyl based rubber or 100 wt. % butyl based rubber.

While the patch bonding surface is typically made of a material having an elastomer content that is diene rubber, particular embodiments include an a bonding surface made of a material having an elastomer content that is at least a majority of butyl based rubber or between 70 and 100 wt. % butyl based rubber, between 80 and 90 wt. % butyl based rubber, between 90 and 100 wt. % butyl based rubber or 100 wt. % butyl based rubber.

The steps of bonding a patch to a tire include steps such as the following: removing dirt and debris from the bonding area, roughening the bonding surfaces of the patch and/or the tire, priming either or both of the bonding surfaces, applying the surface activator to one or both of the bonding surfaces, applying the polyurethaneurea adhesive material to one or both of the bonding surfaces.

The thickness of the adhesive is typically between about 0.01 mm and about 2.5 mm. In particular embodiments, the thickness of the polyurethaneurea adhesive is about 0.6 mm. The patch is then applied to the surface and pressure is applied until the adhesive is set. In particular embodiments, the adhesive may be cured by applying heat to the patch area. An example of a patch applicator that may be used to install a patch with the polyurethaneurea adhesive is disclosed in U.S. patent application Ser. No. 11/967,158 filed 29 Dec. 2007, which is hereby fully incorporated herein.

Other embodiments include bonding articles to a surface of another article, such as a tire. Such articles that may be bonded to a surface of another article such as a tire include, for example, letters made of an elastomer material or made of metal or fabric. Other articles may include an electronic component or device that may be bonded directly to the surface of the other article, such as a tire, without mounting or enclosing the electronic component or device in a patch. Non-limiting examples of such devices may include, for example, an RFID chip, a surface acoustic wave (SAW) sensor, a pressure and/or temperature sensor. Such devices may be mounted on an inside surface of a tire or on an outside surface of a tire. Such embodiments may include any or all of the following steps: cleaning the surface of the article, such as a tire; applying (as described above) a primer (such as a solution of TIC in a solvent) to the surface; applying (as described above) the elastomer-surface activator to the surface; placing the electronic component or device on the surface of the tire; applying the mixed Part A and Part B reaction components directly over at least a portion of the electronic component, or device thereby bonding the electronic component or device directly to the surface. As noted before, in embodiments that include bonding an article to a tire surface, the article (such as an electronic device or component) may be bonded to the outer or inner surface of the tire.

Optionally, a component such as, for example, an RFID device or a SAW sensor may be applied using a transfer film as known to those having ordinary skill in the art. A transfer film may be a flexible plastic sheet. The device may be placed on the transfer film and then covered at least partially with the polyurethaneurea components (Part A and Part B mixtures). The film with the tag may then be placed at the desired location, e.g., the surface of a tire, with the film facing outward. The film may then be peeled off leaving the component bonded to the surface.

A tire or other article comprising an elastomer surface may be repaired by filling a hole, cut, gash, gouge or other opening in the article with the polyurethaneurea system disclosed herein. Passenger tires, truck tires, motorcycle tires, off-road tires and other types of tires may be repaired or patched using the polyurethaneurea system of the present invention. The material is especially useful for repairing a gash, hole or gouge in the sidewall of a tire. In particular embodiments, the articles are repaired by applying the elastomer surface activator and then the Part A and Part B mixture.

Particular embodiments of the present invention include repairing the sidewall of very large OTR tires for heavy loads such as those used, for example, in earth moving tires and mining industry tires. Such tires typically have a bead seat diameter of at least 25 inches. Sidewall blemishes that occur during the manufacturing process or otherwise can be repaired in such tires by removing material from the tire to the depth of the blemish. In particular embodiments, the depth of the repair can be of any depth as long as the depth does not expose any metal cords or belts. The surface of the repair area may optionally be buffed to roughen the repair area surface and/or cleaned with a primer. Optionally, the surface may be treated with the surface activator as disclosed herein. The repair area is then filled with the polyurethaneurea repair material.

The repair material can then be cured in place without having to place the tire in a curing chamber for curing at high temperature. Instead, the polyurethaneurea repair material can cure at ambient temperatures, i.e., between, for example, about 15° C. and 50° C. or between about 20° C. and 40° C. In particular embodiments, the curing time is about 48 hours but the curing time is dependent on ambient conditions.

Particular embodiments of the present invention therefore include tires or other articles having elastomeric surfaces to be bonded and/or repaired with the polyurethaneurea system. In the case of a tire having a cut, crack, hole or gouge, the area to be repaired is typically prepared by removing loose surface material and cleaning the surface within and around the damaged area. Preparation may include buffing the surface inside the gouge, cut or crack via any conventional apparatus or treatment.

If cords in the tire have been damaged, the damaged cords may be removed and a reinforced patch applied to the inner surface of the tire as known to those having ordinary skill in the art. Such cords may be made of polyester, nylon, steel, rayon and the like. The reinforced patch may be bonded to the inner surface of the tire using the polyurethaneurea system disclosed herein. Likewise, if the damage results in a hole through the sidewall, a patch may similarly be applied to the inner surface of the tire as part of the repair.

The interior faces of the gouge, crack and/or hole may then optionally be coated with the elastomer-surface activator as described above. The damaged area is then filled with the polyurethaneurea material by mixing the Part A and Part B materials and applying the mixture in the crack or gouge. The material is then allowed to cure at ambient temperature, i.e., between about 20° C. and 40° C. The material can be placed in an autoclave if other repairs to the tire require curing under heat and pressure as known to those having ordinary skill in the art.

Since the curing of the polyurethaneurea material occurs at ambient temperature, the polyurethaneurea system of the present invention is particularly useful for in situ repair of large items, such as off-the-road tires, conveyor belts and the like. The polyurethaneurea system can be used on the job site with no special autoclaves, steam chambers or vulcanizable tire repair equipment needed.

Particular embodiments of the present invention further include bonding a tread band to a tire carcass, wherein the tire carcass is new or used. Bonding a tread band to a used tire carcass is known as retreading a tire. Embodiments of the present invention further include a tire having a tread bonded thereto with the polyurethaneurea system of the present invention.

A retread process of the present invention includes removing the old tread from a tire carcass, treating the tire carcass with the elastomer-surface activator or treating the tread band with the elastomer-surface activator or treating both with the elastomer-surface activator. The method further includes applying the mixed polyurethaneurea reactants to the exposed faces of the tread band or the tire carcass or both, and then placing the tread band over the surface of the tire carcass.

Particular embodiments of the present invention include bonding or repairing articles having elastomeric faces, especially those having at least one face comprising a cross-linked rubber composition. Particular embodiments have at least one face comprising a cross-linked rubber composition comprising predominately at least one diene elastomer.

The term "diene elastomer" means an elastomer derived at least in part (i.e., a homopolymer or a copolymer) from diene monomers (monomers bearing two conjugated or unconjugated carbon-carbon double bonds), in particular:

any homopolymer obtained by polymerization of a conjugated diene monomer containing from 4 to 12 carbon atoms;

any copolymer obtained by copolymerization of one or more dienes, conjugated together or with one or more vinyl aromatic compounds containing from 8 to 20 carbon atoms;

a ternary copolymer obtained by copolymerization of ethylene or of an alpha-olefin containing 3 to 6 carbon atoms with an unconjugated diene monomer containing from 6 to 12 carbon atoms, such as the elastomers obtained from ethylene or from propylene with an unconjugated diene monomer of the above-mentioned type, in particular, 1,4-hexadiene, ethylidenenorbornene or dicyclopentadiene; or a copolymer of isobutene and of isoprene (butyl rubber or IIR), and also the halogen, in particular chloro or bromo, versions of this type of copolymer.

Particularly preferred diene elastomers are chosen from the group consisting of polybutadienes (BR), polyisoprenes (IR) or natural rubber (NR), styrene-butadiene copolymers (SBR), terpolymers of ethylene, of propylene and of a diene (EPDM), butyl-based rubber and chloroprene. Butyl based rubbers are those that are based on polyisobutylene, which is a polymerization product of isobutylene and isoprene. Other butyl based rubbers include, for example, halogenated butyl rubbers such as chlorobutyl rubber and bromobutyl rubber.

In a further embodiment of the invention, one of the faces of the parts to be bonded together by the polyurethaneurea system adhesive to obtain the above-mentioned article comprises a cross-linked rubber composition, while the other face comprises a ferrous metal or an iron-based metal alloy, such as steel.

According to a still further embodiment of the invention, one of the faces comprises a cross-linked rubber composition, while the other face comprises a synthetic fabric, such as a fabric of bi-elastic knit type to form membranes of configuration containing fibers sold under the registered trademark "LYCRA".

According to a still further aspect of the invention, one of the faces comprises a cross-linked rubber composition, while the other face comprises a rigid plastic, such as a thermosetting polyurethane (for example, application of decoration to tire covers).

The invention is further illustrated by the following examples, which are to be regarded only as illustrations and not delimitative of the invention in any way.

Example 1

Batches of the polyurethaneurea systems A1, A2 and A3 were prepared using the reactant components shown in Table 1. The two-part adhesive/repair materials were prepared by mixing the Part A components with the Part B components. These polyurethaneurea materials were then used to bond two pieces of elastomer together by filling a gap between the two pieces of elastomer with the polyurethaneurea system. The resulting bonding strengths were then measured.

TABLE 1

Polyurethaneurea Reactant Components

| Reactant Component | Description | OH Index | NCO (%) | Adhesive Makeup (wt. part) | | | |
|---|---|---|---|---|---|---|---|
| | | | | A1 | A2 | A3 | A4 |
| Part A | | | | | | | |
| ETHACURE 300 | aromatic diamine chain extender | 523 | | 6.39 | 5.53 | 5.53 | 5.55 |
| TERATHANE 2900 | oligomeric polyol | 39 | | 91.33 | 92.16 | 92.16 | 92.59 |
| REACTINT BLACK | polyol bound colorant | 104 | | 0.64 | 0.65 | 0.65 | 0.65 |
| TINUVIN B75 | protectorants | — | | 0.73 | 0.74 | 0.74 | 0.74 |
| DABCO 33-LV | catalyst | 560 | | 0.91 | 0.92 | 0.92 | 0.46 |
| Part B | | | | | | | |
| VIBRATHANE B836 | polyether-based aromatic diisocyanate | | 8.85 | 13.0 | 14.4 | 51.95 | 14.4 |

TABLE 1-continued

Polyurethaneurea Reactant Components

| Reactant Component | Description | OH Index | NCO (%) | A1 | A2 | A3 | A4 |
|---|---|---|---|---|---|---|---|
| ISONATE 143L | polycarbodiimide-based aromatic diisocyanate | | 29 | 15.9 | 14.4 | 2.75 | 14.4 |
| | NCO/(NH$_2$+OH) molar ratio | | | 1.03 | 1.03 | 1.02 | 1.03 |
| Surface Activator | | | | | A2B | A3B | A3B |
| VIBRATHANE B836 | polyether-based aromatic diisocyanate | | 8.85 | | 50 | 95 | 95 |
| ISONATE 143L | polycarbodiimide-based aromatic diisocyanate | | 29 | | 50 | 5 | 5 |

ETHACURE 300 is a short-chained aromatic diamine chain extender available from Albemarle Corporation. This product is predominately the aromatic diamine 3,5-dimethylthio-2,4- (and 2,6) toluenediamine (DMTDA). TERATHANE 2900 is a oligomeric polyol available from DuPont. This product is a polytetramethylene ether glycol (PTMEG) having an average molecular weight of 2900. REACTINT BLACK X95AB is a polyol bound colorant available from Milliken Chemical. TINUVIN B75 is a protectorant system available from Ciba Specialty Chemicals. ISONATE 143L is a polycarbodiimide-based aromatic diisocyanate available from Dow Chemical. This modified MDI product is a polycarbodiimide-modified diphenylmethane diisocyanate. VIBRATHANE B836 is a polyether-based aromatic diisocyanate available from Chemtura. This product is an MDI-terminated polyether (PTMEG backbone) diisocyanate. DABCO 33-LV is the reactivity catalyst triethylenediamine available from Air Products.

The Part A materials were mixed together and the Part B materials were mixed together and each were then loaded into the cartridges of a two-part adhesive dispenser gun. The cartridges were inserted into the two-part cartridge-based adhesive dispenser gun. The ratio that the gun dispenser delivered Part A and Part B to the static mixer was 4:1; i.e., the dispenser delivered 4 times as much volume of Part A as of Part B, for A1 and A2 and 2:1 for A3. The Part A and Part B reaction components were mixed by the adhesive dispenser through the attached disposable static mixer.

Elastomer-surface activator was also prepared. The elastomer surface activator was prepared by mixing the diisocyanates in the quantities shown in Table 1 with a solvent. The weight percent of each of the diisocyanates shown in Table 1 is based upon the total mass of the diisocyanates. The diisocyanates were mixed in a solvent to form the elastomer-surface activator that was made up of 50 wt. % (based on the total weight of the solution) of ethyl acetate or toluene as the solvent and 50 wt. % of the diisocyanates.

Example 2

Three different rubber elastomer materials were prepared using methods well known to those have ordinary skill in the art. The three materials were a sidewall type (SW) rubber composition comprising natural rubber and cis-polybutadiene rubber, an inner liner type (IL) rubber comprising butyl rubber and a tread type (T) rubber comprising natural rubber. These materials further comprised vulcanizing agents, etc. as known to those having ordinary skill in the art.

Each composition was calendered to a thickness of 2.5 mm and cut into 15×15 cm squares. These squares were cured in a 15×15 cm mold. A strip approximately 1.25 cm was cut from each cured square so that each of the remaining parts of the squares were separated by about 1.25 cm. The volume between the two parts, which was created by cutting out the strip, was then filled with the polyurethaneurea material prepared in Example 1. Some of the surfaces were treated with the elastomer-surface activator prepared in Example 1. It should be noted that the Part A components were heated to 40° C. to improve their flow characteristics. After heating to 40° C., the material will cool to room temperature but maintain good flow characteristics for several hours (4-8) thereafter.

After the polyurethaneurea material filled the gap between the two halves, the samples were cured in the mold. The mold top exerted a pressure of about 1.5 bar on the samples as they were curing. The curing occurred in the mold utilizing the following procedure: after the top was set in place, the mold was heated over a 20 minute period to bring the temperature up from room temperature to 130° C.; the temperature was held at 130° C. for 100 minutes. After cooling, the squares were removed and each cut into six strips to form 6 samples for testing.

Example 3

The test specimens prepared in Example 2 were tested to determine their elongation at break property. The elongation property was measured as elongation at break (%), as measured at 23° C. in accordance with ASTM Standard D412 on ASTM C test pieces. Both the elongation at break % and the break strain (MPa) were recorded. The results are shown in Table 2 for test specimens comprising the sidewall rubber (SW) composition, in Table 3 for test specimens comprising the inner liner (IL) composition and in Table 4 for test specimens comprising the tread (T) composition.

Test specimen No. 1 shown in each of the three tables below was a rubber witness test. The test results for the rubber witness test provided the elongation at break physical property of the rubber composition itself without being bonded with the polyurethaneurea system of the present invention.

As shown in Tables 2, 3 and 4, some of the bonded surfaces of the test specimens were primed using a solution of trichloroisocyanuric acid (TIC) in a solvent. The tables indicate which of the specimens were primed, the solvent used and the number of times the solution was applied. For example, test specimen No. 3 shown in Table 2 was primed with three coatings (brush) of a TIC 5 wt. % in ethyl acetate solution. The sample was allowed to dry for 30 minutes at room temperature after being primed and was washed with ethyl acetate after drying.

Likewise, the tables indicate which test specimens were treated with the elastomer-surface activator comprising the components shown in Table 1 of Example 1. The solution of the elastomer-surface activator is also provided in the tables as well as for how long the specimens were allowed to dry before the PUU formulation was added to the surfaces.

TABLE 2

Test Results for Sidewall Rubber (SW) Composition

| | | TIC Primer | | | Surface Activator | | | Test Results | |
| --- | --- | --- | --- | --- | --- | --- | --- | --- | --- |
| TS | PUU Form'n | Sol'n | Rest (min) | Rinse | Activt'r Form'n | Sol'n | Rest (min) | Break Stress (%) | Break Strain (MPa) |
| 1 | None | None | | | None | | | 674 | 20.4 |
| 2 | A2 | None | | | None | | | 0 | 0 |
| 3 | | [5% EtOAc] × 3 | 30 | yes | None | | | 299 | 6.0 |
| 4 | | [5% EtOAc] × 3 | 30 | yes | None | | | 303 | 6.0 |
| 5 | | [5% EtOAc] × 3 | 30 | yes | A2B | [50% toluene] × 2 | 30 | 512 | 14.5 |
| 6 | | [5% EtOAc] × 3 | 30 | yes | A2B | [50% EtOAc] × 2 | 10 | 522 | 14.7 |
| 7 | | [5% EtOAc] × 3 | 30 | yes | A3B | [50% EtOAc] × 2 | 10 | 481 | 13.9 |
| 8 | A3 | [5% EtOAc] × 3 | 30 | yes | A3B | [50% EtOAc] × 2 | 10 | 477 | 13.2 |
| 9 | A2 | [3% EtOAc] × 2 | 30 | yes | None | | | 79 | 1.5 |
| 10 | | [3% EtOAc] × 2 | 30 | yes | A2B | [50% EtOAc] × 2 | 10 | 565 | 16.3 |
| 11 | | [3% EtOAc] × 2 | 10 | yes | A2B | [50% EtOAc] × 2 | 10 | 555 | 16.9 |
| 12 | | [3% EtOAc] × 2 | 10 | no | A2B | [50% EtOAc] × 2 | 10 | 548 | 16.4 |
| 13 | | [1% EtOAc] × 2 | 30 | yes | None | | | 0 | 0 |
| 14 | | [1% EtOAc] × 2 | 30 | yes | A2B | [50% EtOAc] × 2 | 10 | 383 | 9.2 |
| 15 | | None | | | A2B | [50% EtOAc] × 2 | 10 | 550 | 16.2 |
| 16 | | None | | | A2B | [50% EtOAc] × 2 | 10 | 545 | 16.2 |
| 17 | | None | | | A2B | [50% EtOAc] × 1 | 10 | 440 | 11.5 |
| 18 | | None | | | A2B | [No solvent] × 1 | 10 | 452 | 11.2 |

TABLE 3

Test Results for Inner Liner Rubber (IL) Composition

| | | TIC Primer | | | Surface Activator | | | Test Results | |
| --- | --- | --- | --- | --- | --- | --- | --- | --- | --- |
| TS | PUU Form'n | Sol'n | Rest (min) | Rinse | Activt'r Form'n | Sol'n | Rest (min) | Break Stress (%) | Break Strain (MPa) |
| 1 | None | None | | | None | | | 656 | 13.3 |
| 2 | A2 | None | | | None | | | 251 | 4.4 |
| 3 | | [5% EtOAc] × 3 | 30 | yes | None | | | 575 | 11.9 |
| 4 | | [5% EtOAc] × 3 | 30 | yes | A2B | [50% EtOAc] × 2 | 10 | 499 | 11.3 |
| 5 | | [5% EtOAc] × 3 | 30 | yes | A3B | [50% EtOAc] × 2 | 10 | 573 | 12.4 |
| 6 | A1 | [5% EtOAc] × 3 | 30 | yes | A3B | [50% EtOAc] × 2 | 10 | 534 | 12.2 |
| 7 | A2 | [3% EtOAc] × 2 | 30 | yes | None | | | 492 | 11.0 |
| 8 | | [3% EtOAc] × 2 | 30 | yes | A3B | [50% EtOAc] × 2 | 10 | 586 | 13.7 |
| 9 | | [3% EtOAc] × 2 | 10 | no | A3B | [50% EtOAc] × 2 | 10 | 617 | 13.1 |
| 10 | | None | | | A3B | [50% EtOAc] × 2 | 10 | 599 | 13.7 |
| 11 | | None | | | A2B | [50% EtOAc] × 2 | 10 | 533 | 10.6 |

TABLE 4

Test Results for Tread Rubber (T) Composition

| | | TIC Primer | | | Surface Activator | | | Test Results | |
| --- | --- | --- | --- | --- | --- | --- | --- | --- | --- |
| TS | PUU Form'n | Sol'n | Rest (min) | Rinse | Activt'r Form'n | Sol'n | Rest (min) | Break Stress (%) | Break Strain (MPa) |
| 1 | None | None | | | None | | | 480 | 22.4 |
| 2 | A2 | None | | | None | | | 0 | 0 |
| 3 | | [3% EtOAc] × 2 | 30 | yes | None | | | 244 | 5.7 |
| 4 | | [3% EtOAc] × 2 | 30 | yes | A2B | [50% EtOAc] × 2 | 10 | 464 | 19.0 |
| 5 | | | | | A2B | [50% EtOAc] × 2 | 10 | 507 | 21.7 |

Figure 4:
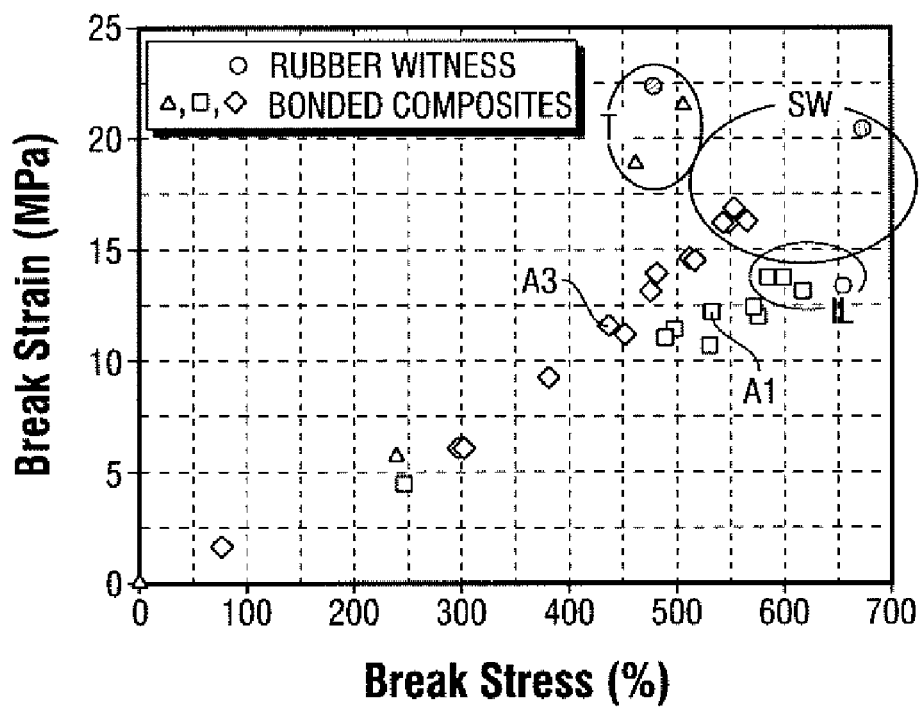
FIG. 4 is a graph plotting break stress and break strain of several different rubber compositions bonded with exemplary polyurethaneurea systems in accordance with the present invention.

The test results shown in Tables 2-5 are plotted in FIG. 4. The selected zones circles in FIG. 4 define an optimal adhesion condition for each of the different rubber compositions.

Example 4

Samples of the A2 material were prepared and allowed to cure into sheets. ASTM C test pieces of each of the rubber compositions (T, SW, IL) that were prepared in Example 2 as well as of the A2 material were prepared.

The moduli of elongation were then measured on the test pieces at 10%, 50%, 100%, 200% and 300% at a temperature of 26° C. in accordance with ASTM D412 (1998) on the ASTM C test pieces. These are true secant moduli in MPa, that is to say the secant moduli calculated reduced to the real cross-section of the test piece at the given elongation. Hysteresis was also determined on each of the test pieces. The test procedures were run on an INSTRON, Model 5500R test machine.

Figure 2:
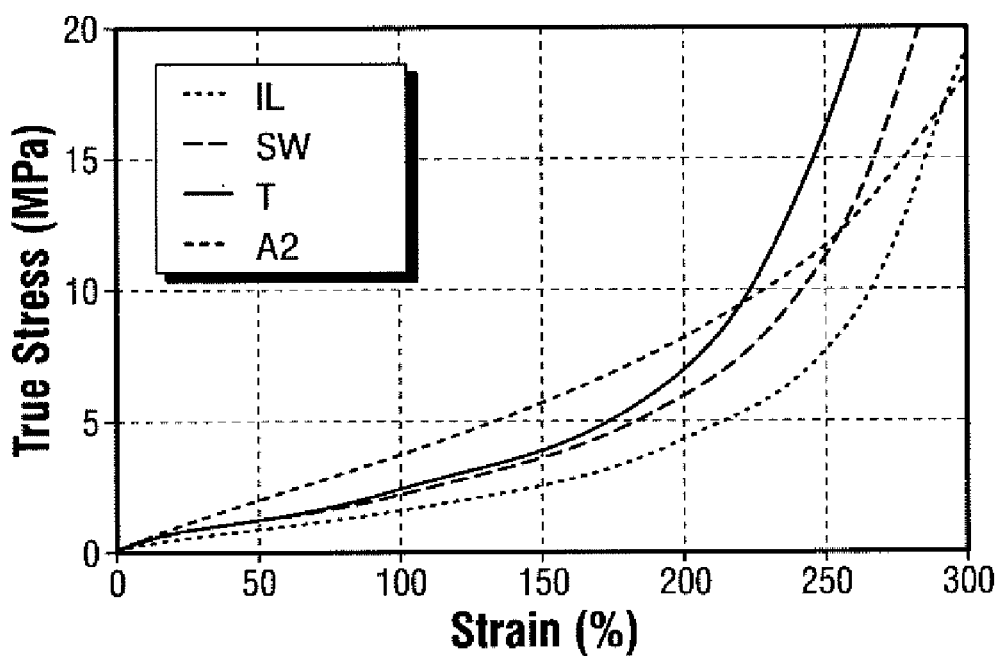
FIG. 2 is a graph plotting strain and true stress of different rubber compositions and an exemplary polyurethaneurea material in accordance with the present invention.
Figure 3:
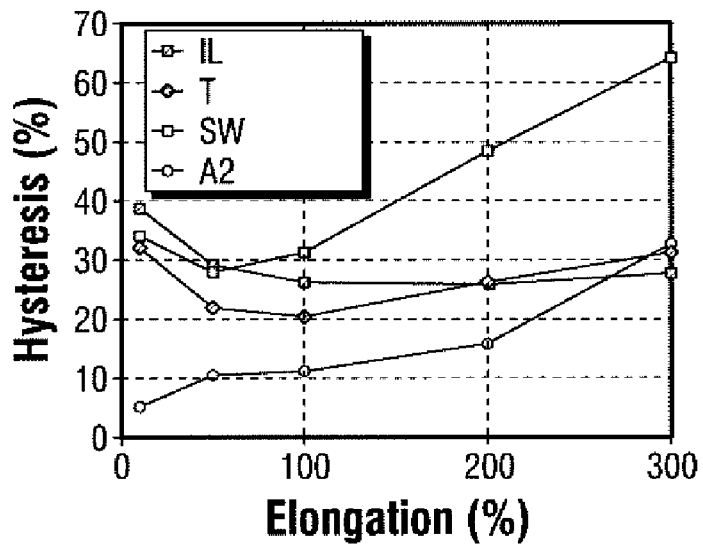
FIG. 3 is a graph plotting elongation and hysteresis of different rubber compositions and an exemplary polyurethaneurea material in accordance with the present invention.

The results of these tests are shown in FIGS. 1-3. As may be seen from these figures, the A2 polyurethaneurea material matches well the rigidity and elasticity measurements of the different rubber compositions. FIGS. 1 and 2 illustrate that the A2 material is more rigid at low deformation. FIG. 3 illustrates the low hysteresis of the material at low deformation. Although not clearly shown in FIG. 2, it has been shown that at high deformation, e.g., above 300% strain, the A2 material is softer than the T and SW material.

Example 5

This example illustrates the excellent bonding of a butyl based rubber to a butyl based rubber using the polyurethaneurea adhesive system in accordance with an embodiment of the present invention. An RFID patch having a bromobutyl bonding surface was bonded to a bromobutyl inner liner with the polyurethaneurea adhesive identified as formulation A4 in Table 1 of Example 1. The formulation was prepared as described in Example 1.

The RFID patch was about 4 cm by about 16 cm and was shaped with rounded corners and with the width of the patch at the center slightly larger than the widths of the patch at either end. The endurance tests of the patches mounted to the inner liners the tires were run on two Michelin 275/80 R 22.5×DA-HT tires. Each tire had two patches mounted on the inner liner, one patch on the DOT side (A side) and the other patch on the opposite side (B side). The patches were located about 110 mm from the lower lip of the tire.

The patches and the inner liner of the tire were prepared using the TiC primer and the surface activator as shown in Table 5. The four patches tested are labeled in Table 5 as being on tire 1 and tire 2, either on the A side (DOT side) or the B side (opposite side). Both the TIC primer and the surface activator were applied with 3 coatings on the patch and 5 coatings on the inner liner as described in Table 5.

TABLE 5

Test Results for Butyl Patch Attached to Tire Inner Liner

| | | TIC Primer | | | Surface Activator | | | Test |
|---|---|---|---|---|---|---|---|---|
| TS | PUU Form'n | Sol'n [3% EtOAc] | Rest (min) | Rinse | Activt'r Form'n | Sol'n [50% EtOAc] | Rest (min) | Results Separation |
| 1A | A4 | 3x patch 5x IL | 15 | yes | A3B | 3x patch 5x IL | 10 | None |
| 1B | | 3x patch 5x IL | 15 | yes | A3B | 3x patch 5x IL | 10 | None |
| 2A | | 3x patch 5x IL | 15 | yes | A3B | 3x patch 5x IL | 10 | None |
| 2B | | 3x patch 5x IL | 15 | yes | A3B | 3x patch 5x IL | 10 | None |

Using the patch applicator described above, the polyurethaneurea formulation was applied to the patch. The thickness of the polyurethaneurea was 0.6 mm. The patch was applied to the inner liner and a pressure of about 2 bars was applied. The temperature around the patch was increased from ambient to 127° C. over a 15 minute period and then the temperature was held at 127° C. for 95 minutes. The patch applicator was removed and the patch cooled.

The tires were tested on a tire-on-tire test station, i.e., one tire rolling against another tire in a tread-to-tread configuration. The loading on the tires was 3983 daN with the tire pressure controlled at 7.1 bars during the test. The tires were inflated with nitrogen. The test was run at 57 km/h with the test cell maintained at 25° C. The tires were mounted on a 22.5×7.5 wheel.

The testing was run at these conditions for 83, 413 km with periodic stops to examine the patches. During these testing procedures, the patches remained fully attached to the inner liner of the tires with no separation anywhere between the patch and the inner liner of the tire. The butyl to butyl bonding by the polyurethaneurea adhesive was robust.

Example 6

This example demonstrates the utility of the polyurethaneurea repair material for repairing raised letters on a tire sidewall. The raised white letters on a tire sidewall were damaged during manufacture, creating a gash in the letter. A form was made having the same height as the damaged letters. The form was placed against the side of the damaged letter creating a barrier to prevent the repair material from running out of the repaired area.

The exposed surface of the damaged area was primed with the TIC solution and then the surface activator A2B (See Table 1) was applied. The A2 formulation was prepared as described in Table 1 (except without the black colorant) and approximately 16 g of titanium oxide was added as a white colorant.

The repair material was injected into the damaged area and allowed to rest for about 2 minutes. Then a spatula was run across the top surface to smooth the repair material to the same level as the top surface of the letter. The material was then cured at ambient temperature for about 48 hours and the form was removed.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single"

shall be used to indicate that one and only one of something is intended. Similarly, other specific integer values, such as "two," are used when a specific number of things is intended. The terms "optionally," "may," and similar terms are used to indicate that an item, condition or step being referred to is an optional (not required) feature of the invention. Ranges that are expressed as being between two points, such as between x and y, include x and y in the range.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A tire for a vehicle, comprising:
an inner liner having an elastomer content that is in majority a butyl based rubber;
a patch bonded to the inner liner, the patch having a bonding surface having an elastomer content that is in majority a diene rubber;
a polyurethaneurea adhesive bonding the bonding surface of the patch to the inner liner, the polyurethaneurea adhesive is the reaction product of reaction components, the reaction components comprising:
part A, wherein part A is a mixture comprising:
between about 55 and about 75 wt. % of an oligomeric polyol having an average molecular weight greater than about 1000 wherein greater than 75 wt. % of the oligomeric polyols is primary oligomeric polyol;
between about 3 and about 7 wt. % of an aromatic diamine chain extender; and
between about 0.1 and about 1.5 wt. % of a reactivity catalyst; and
part B, wherein part B is a mixture comprising:
between about 1 and about 15 wt. % of a short aromatic diisocyanate; and
between about 5 and about 35 wt. % of an aromatic diisocyanate prepolymer that is the reaction product of a short aromatic diisocyanate and a diol, wherein the mass fraction of each of the reaction components is based upon the total mass of the part A and part B reaction components.

2. The tire of claim 1, wherein the oligomeric polyol comprises greater than about 95 wt. % primary oligomeric polyol.

3. The tire of claim 1, wherein one or both of the inner liner surface and the mounting surface of the patch are treated surfaces, the treated surfaces treated with an elastomer-surface activator comprising a second short aromatic diisocyanate and a second aromatic diisocyanate prepolymer.

4. The tire of claim 3, wherein at least one of the second diisocyanates of claim 3 is the same as at least one of the diisocyanates of claim 1.

5. The tire of claim 3, wherein the elastomer-surface activator includes between 0 and 90 wt. % of the short aromatic diisocyanate, wherein the mass fraction is based upon the total mass of the diisocyanates in the elastomer-surface activator.

6. The tire of claim 5, wherein the elastomer-surface activator includes between 5 and 80 wt. % of the short aromatic diisocyanate.

7. The tire of claim 1, wherein the short aromatic diisocyanate is a polycarbodiimide-modified diphenylmethane diisocyanate.

8. The tire of claim 1, wherein the short aromatic diisocyanate is selected from 2, 4 and/or 2,6 toluene diisocyanate (TDI), 4,4'-diphenyl-methane diisocyanate (MDI), polymeric MDI, modified MDI compounds, naphthalene diisocyanate (NDI) or combinations thereof.

9. The tire of claim 1, wherein the aromatic diisocyanate prepolymer is an MDI-terminated polyether diisocyanate.

10. The tire of claim 1, wherein the aromatic diisocyanate prepolymer is the reaction product of the diol that is selected from a polyether-based diol, a polyester-based diol or combinations thereof.

11. The tire of claim 1, wherein the oligomeric polyol is a polytetramethyleneglycol having an average molecular weight between about 1500 and about 4000.

12. The tire of claim 1, wherein the aromatic diamine chain extender is a mixture of 2,4 and 2,6 isomers of dimethylthiotoluenediamine.

13. The tire of claim 1, wherein a ratio of isocyanate functionalities to a total of the amine and hydroxyl functionalities in a mixture of part A and part B is between 0.8 and 2.

14. The tire of claim 13, wherein the ratio of isocyanate functionalities to the total of the amine and hydroxyl functionalities in the mixture of part A and part B is between 1.0 and 1.07.

15. The tire of claim 1, wherein the elastomer content of the patch bonding surface and the inner liner of the tire is between 90 and 100 wt. % bromobutyl rubber.

16. The tire of claim 1, wherein the patch further comprises:
an electronic component.

17. The tire of claim 16, wherein the electronic component is a piezoelectric device.

18. The tire of claim 16, wherein the component comprises an RFID chip.

19. The tire of claim 16, wherein the article comprises a transmitter and an antenna.

* * * * *